(12) United States Patent
Chen

(10) Patent No.: US 12,720,582 B2
(45) Date of Patent: Aug. 25, 2026

(54) SENSING RESOURCE ALLOCATION METHOD AND APPARATUS, SENSING RESOURCE USAGE METHOD AND APPARATUS, DEVICE, AND STORAGE MEDIUM

(71) Applicant: Beijing Xiaomi Mobile Software Co., Ltd., Beijing (CN)

(72) Inventor: Dong Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 141 days.

(21) Appl. No.: 18/701,444

(22) PCT Filed: Oct. 20, 2021

(86) PCT No.: PCT/CN2021/124850
§ 371 (c)(1),
(2) Date: Apr. 15, 2024

(87) PCT Pub. No.: WO2023/065132
PCT Pub. Date: Apr. 27, 2023

(65) Prior Publication Data

US 2024/0422807 A1 Dec. 19, 2024

(51) Int. Cl.
*H04W 4/02* (2018.01)
*H04W 4/44* (2018.01)
(Continued)

(52) U.S. Cl.
CPC ....... *H04W 72/51* (2023.01); *H04W 72/0446* (2013.01)

(58) Field of Classification Search
CPC ... H04W 72/51; H04W 72/0446; H04W 4/02; H04W 4/44
See application file for complete search history.

(56) References Cited

U.S. PATENT DOCUMENTS

2015/0181560 A1* 6/2015 Jamadagni .............. H04W 4/70 370/329
2017/0201997 A1* 7/2017 Cheng ................ H04W 72/541
(Continued)

FOREIGN PATENT DOCUMENTS

CN 103997539 A 8/2014
CN 110766344 A 2/2020
(Continued)

OTHER PUBLICATIONS

ISA State Intellectual Property Office of the People's Republic of China, International Search Report Issued in Application No. PCT/CN2021/124850, Jun. 29, 2022, WIPO, 4 pages.

*Primary Examiner* — Chris Parry
*Assistant Examiner* — Hassan Abdur-Rahman Khan
(74) *Attorney, Agent, or Firm* — Volpe Koenig

(57) ABSTRACT

A method, apparatus and computer-readable medium for improving resource utilization efficiency in a wireless communication system. The utilization efficiency is improved by: receiving the sensing resource request from the user equipment, where the sensing resource request includes a characteristic of the sensing service of the user equipment; according to the characteristic of the sensing service, allocating a sensing resource for the sensing service to the user equipment; and transmitting the information of the sensing resource for the sensing service to the user equipment.

12 Claims, 10 Drawing Sheets

(51) Int. Cl.

| | |
|---|---|
| ***H04W 72/0446*** | (2023.01) |
| ***H04W 72/51*** | (2023.01) |

(56) References Cited

U.S. PATENT DOCUMENTS

| | | | | |
|---|---|---|---|---|
| 2018/0348339 | A1* | 12/2018 | Lien | G01S 13/003 |
| 2019/0238256 | A1* | 8/2019 | Xing | H04L 5/0058 |
| 2019/0293781 | A1* | 9/2019 | Bolin | G01S 13/003 |
| 2020/0015272 | A1* | 1/2020 | Lee | H04W 72/23 |
| 2020/0107249 | A1* | 4/2020 | Stauffer | H04W 48/14 |
| 2020/0260512 | A1* | 8/2020 | Cheng | H04W 76/14 |
| 2021/0022170 | A1* | 1/2021 | Lu | H04W 72/121 |
| 2022/0225121 | A1* | 7/2022 | Wanuga | H04W 16/28 |
| 2022/0256519 | A1* | 8/2022 | Jeon | G01S 7/0235 |
| 2022/0349984 | A1* | 11/2022 | Agardh | G01S 7/006 |
| 2022/0400445 | A1* | 12/2022 | Zorgui | H04W 52/50 |
| 2023/0350017 | A1* | 11/2023 | Dai | G01S 7/4013 |
| 2024/0430067 | A1* | 12/2024 | Jiang | H04W 74/0833 |
| 2025/0093487 | A1* | 3/2025 | Walker | G01S 13/003 |
| 2025/0203516 | A1* | 6/2025 | Nam | H04B 17/328 |
| 2025/0301286 | A1* | 9/2025 | Lee | H04W 48/16 |

FOREIGN PATENT DOCUMENTS

| | | | |
|---|---|---|---|
| CN | 111491252 | A | 8/2020 |
| CN | 113189546 | A | 7/2021 |
| EP | 1443706 | A1 | 8/2004 |

* cited by examiner

SENSING RESOURCE ALLOCATION METHOD AND APPARATUS, SENSING RESOURCE USAGE METHOD AND APPARATUS, DEVICE, AND STORAGE MEDIUM

CROSS REFERENCE TO RELATED APPLICATIONS

This application is a US National Phase of a PCT Application No. PCT/CN2021/124850 filed on Oct. 20, 2021, the entire contents of which are incorporated herein by reference in their entireties.

TECHNICAL FIELD

The present disclosure relates to the field of wireless communication technology, in particular to sensing resource allocation methods and apparatuses, sensing resource usage methods and apparatuses, devices, and storage media.

BACKGROUND

A mobile communicating system is a type of wireless communicating system, mainly including a cellular system, a cluster system, an AdHoc network system, a satellite communicating system, a packet radio network, a cordless telephone system, a radio paging system, etc.

The sensing system, also known as Radio detection and ranging (Radar), uses radio methods to detect targets and determine their spatial positions.

When the mobile communicating system and the sensing system coexist, resources of the sensing system can be used by multiple user equipments, thereby improving the resource utilization rate of the sensing system and avoiding mutual interference when different user equipments use sensing resources.

SUMMARY

The present disclosure provides sensing resource allocation methods and apparatuses, sensing resource usage methods and apparatuses, devices, and storage media.

According to the first aspect of the embodiments of the present disclosure, a sensing resource allocation method is provided, where the method is performed by a network device, and includes:

receiving a sensing resource request from a user equipment, where the sensing resource request includes a characteristic of a sensing service of the user equipment;

according to the characteristic of the sensing service, allocating a sensing resource for the sensing service to the user equipment; and transmitting information of the sensing resource for the sensing service to the user equipment.

According to the second aspect of the embodiments of the present disclosure, a sensing resource usage method is provided, where the method is performed by a user equipment and includes:

transmitting a sensing resource request to a network device, where the sensing resource request includes a characteristic of a sensing service of the user equipment;

receiving information of a sensing resource for the sensing service from the network device; and according to the information of the sensing resource for the sensing service, executing the sensing service by the sensing resource.

According to the third aspect of the embodiments of the present disclosure, an sensing resource allocation apparatus is provided, where the apparatus is applied to a network device, and includes:

a receiving module, configured to receive a sensing resource request from a user equipment, where the sensing resource request includes a characteristic of a sensing service of the user equipment;

a processing module, configured to, according to the characteristic of the sensing service, allocate a sensing resource for the sensing service to the user equipment; and a transmitting module, configured to transmit information of the sensing resource for the sensing service to the user equipment.

According to the fourth aspect of the embodiments of the present disclosure, a sensing resource usage apparatus is provided, where the apparatus is applied to a user equipment, and includes:

a transmitting module, configured to transmit a sensing resource request to a network device, where the sensing resource request includes a characteristic of a sensing service of the user equipment;

a receiving module, configured to receive information of a sensing resource for the sensing service from the network device; and a processing module, configured to, according to the information of the sensing resource for the sensing service, execute the sensing service by the sensing resource.

According to the fifth aspect of the embodiments of the present disclosure, a network-side device is provided, and includes:

one or more processors; and one or more memories storing instructions executable by the processor;

where the one or more processors are configured to execute the instructions in the one or more memories to implement the sensing resource allocation method mentioned above.

According to the sixth aspect of the embodiments of the present disclosure, a mobile terminal is provided, and includes:

one or more processors; and one or more memories storing instructions executable by the processor;

where the one or more processors are configured to execute the instructions in the one or more memories to implement the sensing resource usage method mentioned above.

According to the seventh aspect of the embodiments of the present disclosure, a non-temporary computer-readable storage medium is provided, on which executable instructions are stored. When the executable instructions are executed by one or more processor, the steps of the sensing resource allocation method or the sensing resource usage method are implemented.

It is to be understood that the above general descriptions and the below detailed descriptions are merely exemplary and explanatory, and are not intended to limit the present disclosure.

BRIEF DESCRIPTION OF DRAWINGS

The accompanying drawings illustrated herein are used to provide further understanding of the embodiments of the present disclosure and form a part of the present disclosure. The exemplary embodiments and descriptions of the present disclosure are used to explain the present disclosure, and do not constitute an improper limitation of the present disclosure.

DETAILED DESCRIPTION

Further explanation of the embodiments of the present disclosure is provided in conjunction with the accompanying drawings and the detailed description.

Embodiments will be described in detail herein, examples of which are illustrated in the accompanying drawings. When the following descriptions involve the drawings, like numerals in different drawings represent like or similar elements unless stated otherwise. The embodiments described in the following examples do not represent all embodiments consistent with the present disclosure. Rather, they are merely embodiments of devices and methods consistent with some aspects of the present disclosure as recited in the appended claims.

It should be noted that an embodiment of the present disclosure may include multiple steps. For ease of description, these steps have been numbered. However, these numbers are not a limitation on the execution time slot between steps and the execution order of steps. These steps can be implemented in any order, which is not limited in the embodiments of the present disclosure.

In a mobile communicating system, mobile communications use radio waves for information transmission. Radar, also known as "radio positioning", emits electromagnetic waves to illuminate a target and receive echoes from the target, thereby obtaining information such as distance, distance change rate (radial velocity), orientation, and height from the target to the electromagnetic wave emitting point.

When the mobile communicating system and the sensing system coexist, sensing resources can be reasonably and efficiently allocated through the mobile communicating system, such that the user equipment can effectively use the sensing resource.

Figure 1:
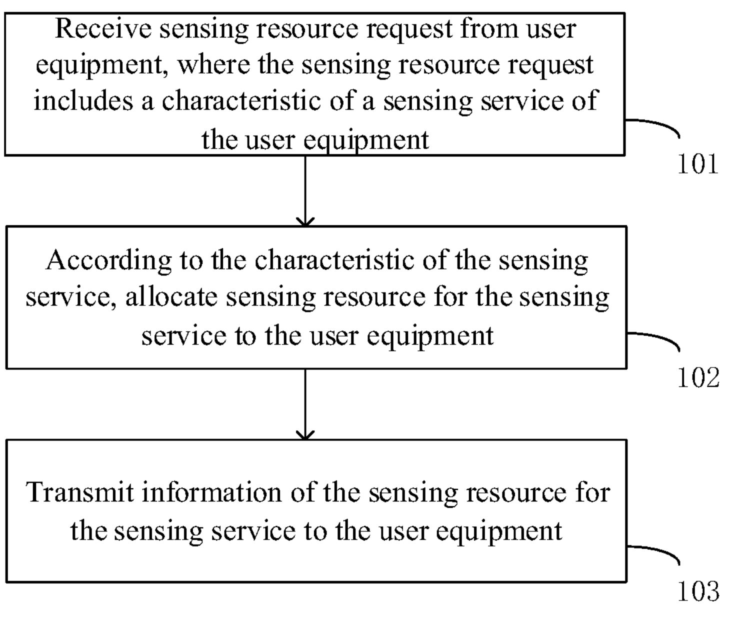
FIG. 1 is a flowchart of a sensing resource allocation method according to an embodiment.

The embodiments of the present disclosure provide a sensing resource allocation method, which is performed by a network device. The method can be performed independently or in conjunction with any other embodiment of the present disclosure. FIG. 1 is a flowchart of a sensing resource allocation method according to an embodiment. As shown in FIG. 1, the method includes steps 101-103.

In step 101, a sensing resource request is received from a user equipment, where the sensing resource request includes a characteristic of a sensing service of the user equipment.

In step 102, according to the characteristic of the sensing service, a sensing resource for the sensing service is allocated to the user equipment.

In step 103, information of the sensing resource for the sensing service is transmitted to the user equipment.

In an embodiment, the network device receives a sensing resource request from a user equipment, where the sensing resource request includes the characteristic of the sensing service of the user equipment. Based on the characteristic of the sensing service, the network device allocates the sensing resource for the user equipment that transmits the sensing resource request, and then transmits the information of the allocated sensing resource to the user equipment. Since the allocation of the sensing resource is performed based on the characteristic of the sensing service, the allocated sensing resource is suitable for the characteristic of the sensing service. For example, for a sensing service with a shorter sensing distance, fewer time ranges are allocated to the sensing service. For a sensing service with a longer sensing distance, more time ranges are allocated to the sensing service.

In an embodiment, the characteristic of the sensing service includes at least one of: a sensing distance, a sensing range, a size of a sensed object, a shape of a sensed object, or a motion state of a sensed object. For example, the characteristic of the sensing service reported by the user equipment through the sensing resource request is: sensing a motion speed of an object approximately 1 square meter within a range of 3 to 5 meters. For example, the characteristic of the sensing service reported by the user equipment through the sensing resource request is: sensing a shape of an object approximately 5 square meters within a range of 20 to 30 meters.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

Figure 2:
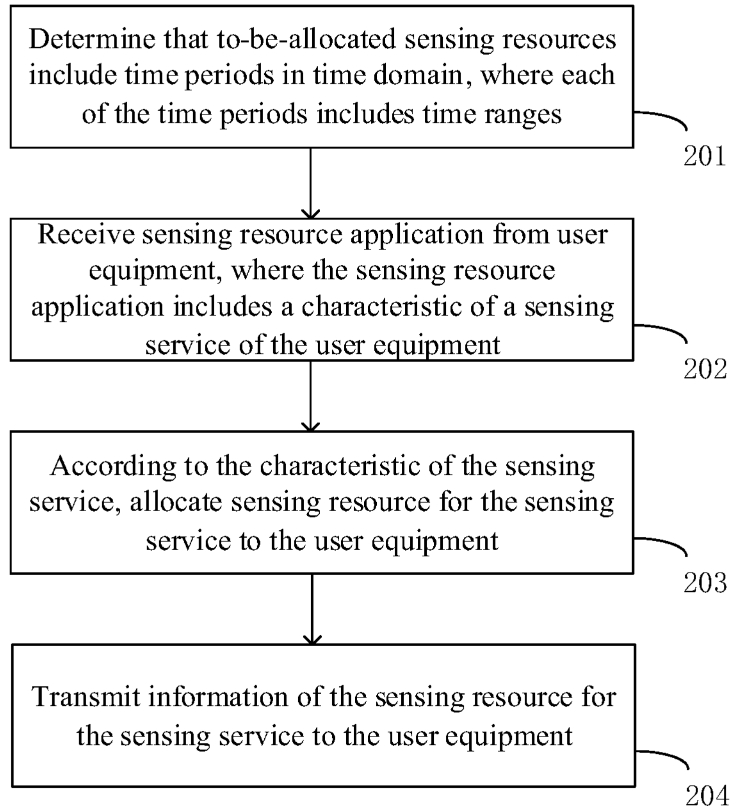
FIG. 2 is a flowchart of a sensing resource allocation method according to an embodiment.

The embodiments of the present disclosure provide a sensing resource allocation method, which is performed by a network device. The method can be performed independently or in conjunction with any other embodiment of the present disclosure. FIG. 2 is a flowchart of a sensing resource allocation method according to an embodiment. As shown in FIG. 2, the method includes steps 201-204.

In step 201, it is determined that to-be-allocated sensing resources include time periods in a time domain, where each of the time periods includes time ranges.

In step 202, a sensing resource application is received from a user equipment, where the sensing resource application includes a characteristic of a sensing service of the user equipment.

In step 203, according to the characteristic of the sensing service, a sensing resource for the sensing service is allocated to the user equipment.

In step 204, information of the sensing resource for the sensing service is transmitted to the user equipment.

In an embodiment, the network device divides the to-be-allocated sensing resources in the time domain, i.e., determines that the to-be-allocated sensing resources include time periods in the time domain, and each of the time periods includes time ranges. The network device receives a sensing resource request from a user equipment, where the sensing resource request includes the characteristic of the sensing service of the user equipment. Based on the characteristic of the sensing service, the network device allocates the sensing resource for the user equipment that transmits the sensing resource request, and then transmits the information of the allocated sensing resources to the user equipment.

In an embodiment, the network device divides the sensing resources into the following time ranges in the time domain:

$T_0, T_1, T_2, \ldots, T_{N-1}, T_0, T_1, T_2, \ldots, T_{N-1}, T_0, T_1, T_2, \ldots, T_{N-1}, \ldots$;

where $T_0, T_1, T_2, \ldots, T_{N-1}$ constitute a time period, i.e., a time period includes N time ranges.

It should be noted that within a time period, a duration of each of time ranges $T_0, T_1, T_2, \ldots, T_{N-1}$ can be the same or different.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

The embodiments of the present disclosure provide a sensing resource allocation method, which is performed by a network device. The method can be performed independently or in conjunction with any other embodiment of the present disclosure. The sensing resource allocation method includes: determining that the to-be-allocated sensing resources include time periods in the time domain, where each of the time periods includes multiple time ranges; receiving the sensing resource request from user equipment, where the sensing resource request includes the characteristic of the sensing service of the user equipment; according to the characteristic of the sensing service, allocating a sensing resource for the sensing service to the user equipment; and transmitting the information of the sensing resource for the sensing service to the user equipment.

The sensing resource used for the sensing service includes:

one or more time ranges for transmitting sensing signals; and one or more time ranges for receiving reflected signals.

In an embodiment, the network device divides the to-be-allocated sensing resources in the time domain, i.e., determines that the to-be-allocated sensing resources include the time periods in the time domain, where each time period includes multiple time ranges; the network device receives a sensing resource request from the user equipment, where the sensing resource request includes the characteristic of the sensing service of the user equipment; according to the characteristic of the sensing service, one or more time ranges for transmitting sensing signals and one or more time ranges for receiving reflected signals are allocated to the user equipment that transmits the sensing resource request; and the information of the one or more time ranges for transmitting sensing signals and the one or more time ranges for receiving reflected signals is transmitted to the user equipment.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

The embodiments of the present disclosure provide a sensing resource allocation method, which is performed by a network device. The method can be executed independently or in conjunction with any other embodiment of the present disclosure. The sensing resource allocation method includes: determining that the to-be-allocated sensing resources include time periods in the time domain, where each of the time periods includes multiple time ranges; receiving the sensing resource request from user equipment, where the sensing resource request includes the characteristic of the sensing service of the user equipment; according to the characteristic of the sensing service, allocating a sensing resource for the sensing service to the user equipment; and transmitting the information of the sensing resource for the sensing service to the user equipment.

The sensing resource used for the sensing service includes:

a first time range for transmitting sensing signals and a second time range for receiving reflected signals;

where the first time range and the second time range belong to the same time period.

In an embodiment, the network device divides the to-be-allocated sensing resources in the time domain, i.e., determines that the to-be-allocated sensing resources include the time periods in the time domain, where each time period includes time ranges; the network device receives a sensing resource request from the user equipment, where the sensing resource request includes the characteristic of the sensing service of the user equipment; according to the characteristic of the sensing service, a first time range for transmitting sensing signals and a second time range for receiving reflected signals are allocated to the user equipment that transmits the sensing resource request; and the information of the first time range for transmitting sensing signals and the second time range for receiving reflected signals is transmitted to the user equipment. The first time range and the second time range belong to the same time period.

In an embodiment, the network device divides the sensing resources into the following time ranges in the time domain: $T_0, T_1, T_2, \ldots, T_{N-1}, T_0, T_1, T_2, \ldots, T_{N-1}, T_0, T_1, T_2, \ldots, T_{N-1}, \ldots$; the network device receives the sensing resource request from the user equipment, where the sensing resource request includes a sensing service, and the characteristic of the sensing service is: sensing the motion speed of an object approximately 1 square meter within a range of 3 to 5 meters; according to the characteristic of the sensing service, the network device allocates the first time range $T_3$ for transmitting sensing signals and the second time range $T_8$ for receiving reflected signals to the user equipment that transmits the sensing resource request; and the information of the first time range $T_3$ for transmitting sensing signals and the second time range $T_8$ for receiving reflected signals is transmitted to the user equipment. Since the sensing distance is short, the first time range $T_3$ and the second time range $T_8$ belong to the same time period.

In an embodiment, the network device divides the sensing resources into the following time ranges in the time domain:

$T_0$, $T_1$, $T_2$, . . . , $T_{N-1}$, $T_0$, $T_1$, $T_2$, . . . , $T_{N-1}$, $T_0$, $T_1$, $T_2$, . . . , $T_{N-1}$, . . . ; the network device receives the sensing resource request from the user equipment, where the sensing resource request includes a sensing service, and the characteristic of the sensing service is: sensing the motion speed of an object approximately 1 square meter within a range of 30 to 50 meters; according to the characteristic of the sensing service, the network device allocates the first time range $T_3$ for transmitting sensing signals and the second time range $T_8$ for receiving reflected signals to the user equipment that transmits the sensing resource request; and the information of the first time range $T_3$ for transmitting sensing signals and the second time range $T_8$ for receiving reflected signals is transmitted to the user equipment. Since the sensing distance is long, the first time range $T_3$ and the second time range $T_8$ respectively belong to different time periods, two adjacent time periods.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

The embodiments of the present disclosure provide a sensing resource allocation method, which is performed by a network device. The method can be executed independently or in conjunction with any other embodiment of the present disclosure. The sensing resource allocation method includes: determining that the to-be-allocated sensing resources include time periods in the time domain, where each of the time periods includes multiple time ranges; receiving the sensing resource request from the user equipment, where the sensing resource request includes the characteristic of the sensing service of the user equipment; according to the characteristic of the sensing service, allocating a sensing resource for the sensing service to the user equipment; and transmitting the information of the sensing resource for the sensing service to the user equipment.

The sensing resource used for the sensing service includes:

- a first time range set for transmitting sensing signals and a second time range set for receiving reflected signals, where the first time range set includes time ranges, and the second time range set includes time ranges;
- where the first time range set and the second time range set belong to the same time period.

In an embodiment, the network device divides the to-be-allocated sensing resources in the time domain, i.e., determines that the to-be-allocated sensing resources include the time periods in the time domain, where each time period includes time ranges; the network device receives a sensing resource request from the user equipment, where the sensing resource request includes the characteristic of the sensing service of the user equipment; according to the characteristic of the sensing service, a first time range set for transmitting sensing signals and a second time range set for receiving reflected signals are allocated to the user equipment that transmits the sensing resource request; and the information of the first time range set for transmitting sensing signals and the second time range set for receiving reflected signals is transmitted to the user equipment. The first time range set and the second time range set both include time ranges, and the first time range set and the second time range set belong to the same time period.

In an embodiment, the network device divides the sensing resources into the following time ranges in the time domain: $T_0$, $T_1$, $T_2$, . . . , $T_{N-1}$, $T_0$, $T_1$, $T_2$, . . . , $T_{N-1}$, $T_0$, $T_1$, $T_2$, . . . , $T_{N-1}$, . . . ; the network device receives the sensing resource request from the user equipment, where the sensing resource request includes a sensing service, and the characteristic of the sensing service is: sensing the shape of an object approximately 5 square meters within a range of 10 to 20 meters; according to the characteristic of the sensing service, the network device allocates the first time range set $T_2$-$T_4$ for transmitting sensing signals and the second time range set $T_8$-$T_{12}$ for receiving reflected signals to the user equipment that transmits the sensing resource request, and then transmits the information of the first time range set $T_2$-$T_4$ for transmitting sensing signals and the second time range set $T_8$-$T_{12}$ for receiving reflected signals to the user equipment. Since the sensing distance is short, the first time range set $T_2$-$T_4$ and the second time range set $T_8$-$T_{12}$ belong to the same time period.

In an embodiment, the network device divides the sensing resources into the following time ranges in the time domain: $T_0$, $T_1$, $T_2$, . . . , $T_{N-1}$, $T_0$, $T_1$, $T_2$, . . . , $T_{N-1}$, $T_0$, $T_1$, $T_2$, . . . , $T_{N-1}$, . . . ; the network device receives the sensing resource request from the user equipment, where the sensing resource request includes a sensing service, and the characteristic of the sensing service is: sensing the shape of an object approximately 5 square meters within a range of 70 to 80 meters; according to the characteristic of the sensing service, the network device allocates the first time range set $T_2$-$T_4$ for transmitting sensing signals and the second time range set $T_8$-$T_{12}$ for receiving reflected signals to the user equipment that transmits the sensing resource request, and then transmits the information of the first time range set $T_2$-$T_4$ for transmitting sensing signals and the second time range set $T_8$-$T_{12}$ for receiving reflected signals to the user equipment. Since the sensing distance is long, the first time range set $T_2$-$T_4$ and the second time range set $T_8$-$T_{12}$ respectively belong to different time periods, two adjacent time periods.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

The embodiments of the present disclosure provide a sensing resource allocation method, which is performed by a network device. The method can be executed independently or in conjunction with any other embodiment of the present disclosure. The sensing resource allocation method includes: determining that the to-be-allocated sensing resources include time periods in the time domain, where each of the time periods includes time ranges; receiving the sensing resource request from the user equipment, where the sensing resource request includes the characteristic of the sensing service of the user equipment; according to the characteristic of the sensing service, allocating a sensing resource for the sensing service to the user equipment; and transmitting the information of the sensing resource for the sensing service to the user equipment.

The sensing resource used for the sensing service includes:

- one or more time ranges for transmitting sensing signals;
- one or more time ranges for receiving reflected signals; and the maximum number of time periods occupied by the one or more time ranges for transmitting sensing signals and the one or more time ranges for receiving reflected signals.

In an embodiment, the network device divides the to-be-allocated sensing resources in the time domain, i.e., determines that the to-be-allocated sensing resources include time periods in the time domain, where each of the time periods includes time ranges; the network device receives a sensing resource request from the user equipment, where the sensing resource request includes the characteristic of the sensing service of the user equipment; according to the characteristic of the sensing service, the network device allocates one or more time ranges for transmitting sensing signals, one or more time ranges for receiving reflected signals, and the maximum number of time periods occupied by the one or more time ranges for transmitting sensing signals and the one or more time ranges for receiving reflected signals to the user equipment that transmits the sensing resource request, and then transmits the information of the one or more time ranges for transmitting sensing signals, the one or more time ranges for receiving reflected signals, and the maximum number of time periods to the user equipment.

It should be noted that when the user equipment executes the sensing service, the transmission of sensing signals and the reception of reflected signals appear in pairs. Therefore, the maximum number of time periods occupied by the time range(s) for transmitting sensing signals is the same as the maximum number of time periods occupied by the time range(s) for receiving reflected signals.

When the first time range/the first time range set for transmitting sensing signals and the second time range/the second time range set for receiving reflected signals belong to the same time period, the maximum number of time periods occupied by the time range(s) for transmitting sensing signals and the time range(s) for receiving reflected signals mentioned above is the maximum number of time periods occupied by the time range(s) for transmitting sensing signals, or the maximum number of time periods occupied by the time range(s) for receiving reflected signals.

When the first time range/the first time range set for transmitting sensing signals and the second time range/the second time range set for receiving reflected signals belong to different time periods, the maximum number of time periods occupied by the time range(s) for transmitting sensing signals and the time range(s) for receiving reflected signals mentioned above is the maximum number of time periods occupied by the time range(s) for transmitting sensing signals plus the maximum number of time periods occupied by the time range(s) for receiving reflected signals.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

Figure 3:
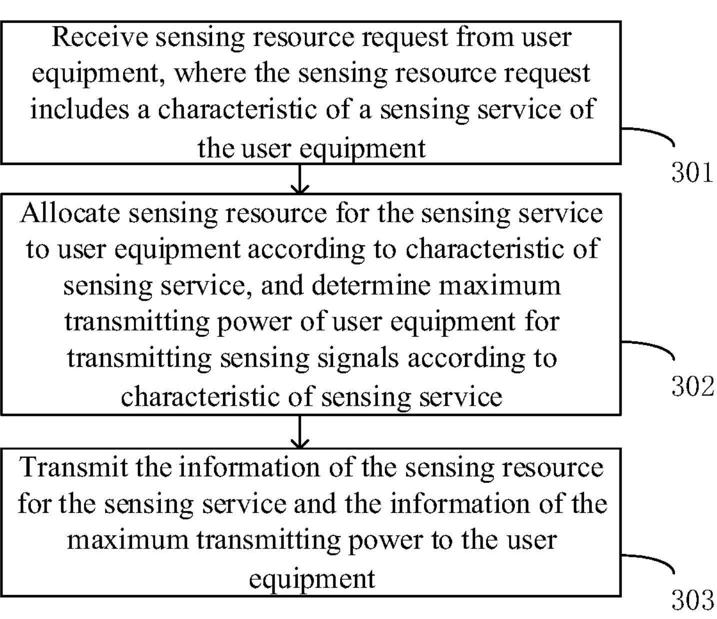
FIG. 3 is a flowchart of a sensing resource allocation method according to an embodiment.

The embodiments of the present disclosure provide a sensing resource allocation method, which is performed by a network device. The method can be executed independently or in conjunction with any other embodiment of the present disclosure. FIG. 3 is a flowchart of a sensing resource allocation method according to an embodiment. As shown in FIG. 3, the method includes steps 301-303.

In step 301, a sensing resource request is received from a user equipment, where the sensing resource request includes a characteristic of a sensing service of the user equipment.

In step 302, a sensing resource for the sensing service is allocated to the user equipment according to the characteristic of the sensing service, and a maximum transmitting power of the user equipment for transmitting sensing signals is determined according to the characteristic of the sensing service.

In step 303, the information of the sensing resource for the sensing service and the information of the maximum transmitting power are transmitted to the user equipment.

In an embodiment, the network device receives a sensing resource request from the user equipment, where the sensing resource request includes the characteristic of the sensing service of the user equipment; and according to the characteristic of the sensing service, the network device allocates the sensing resource for the sensing service to the user equipment that transmits the sensing resource request, determines the maximum transmitting power of the user equipment for transmitting sensing signal, and then transmits the information of the allocated sensing resource and the information of the maximum transmitting power to the user equipment. Since the allocation of the sensing resource and the determination of maximum transmitting power are based on the characteristic of sensing service, the allocated sensing resource and the determined maximum transmitting power are suitable for the sensing service. For example, when the sensing distance is short, the maximum transmitting power can be determined as a smaller power; and when the sensing distance is long, the maximum transmitting power can be determined as a larger power.

In the above embodiments, the network device allocates the sensing resource suitable for the sensing service to the user equipment based on the characteristic of the sensing service and determines the maximum transmitting power of the sensing signal for the user equipment. On the one hand, sensing resources are reasonably allocated to avoid interference between sensing signals. On the other hand, sensing resources can be effectively used, which improves resource utilization efficiency. In addition, reasonably setting the transmitting power of the sensing signal for the user equipment can help control the power of the user equipment.

The embodiments of the present disclosure provide a sensing resource allocation method, which is performed by a network device. The method can be executed independently or in conjunction with any other embodiment of the present disclosure. The sensing resource allocation method includes: receiving the sensing resource request from the user equipment, where the sensing resource request includes a characteristic of the sensing service of the user equipment; according to the characteristic of the sensing service, allocating a sensing resource for the sensing service to the user equipment; and transmitting the information of the sensing resource for the sensing service to the user equipment.

The characteristic of the sensing service includes at least one of:

a sensing distance, a sensing range, a size of a sensed object, a shape of a sensed object, or a motion state of a sensed object.

In an embodiment, a network device receives a sensing resource request from a user equipment, where the sensing resource request includes a characteristic of the sensing service of the user equipment, where the characteristic of the sensing service includes at least one of: a sensing distance, a sensing range, a size of a sensed object, a shape of a sensed object, or a motion state of a sensed object; according to the characteristic of the sensing service, the network device allocates the sensing resource used for the sensing service to the user equipment that transmits the sensing resource request, and then transmits the information of the allocated sensing resource to the user equipment. Since the allocation of the sensing resource is based on the characteristic of the sensing service, the allocated sensing resource is suitable for the characteristic of the sensing service.

For example, the characteristic of the sensing service reported by the user equipment through a sensing resource request is: sensing a motion speed of an object approximately 1 square meter within a range of 3 to 5 meters. For example, the characteristic of the sensing service reported by the user equipment through a sensing resource request is: sensing a shape of an object approximately 5 square meters within a range of 20 to 30 meters.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

Figure 4:
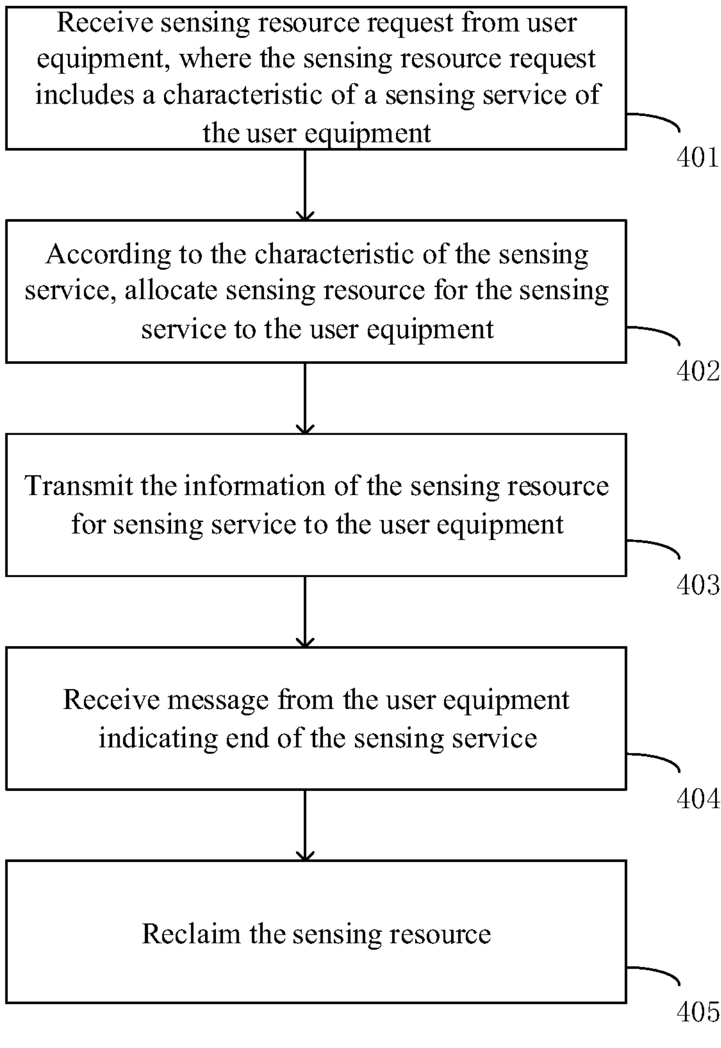
FIG. 4 is a flowchart of a sensing resource allocation method according to an embodiment.

The embodiments of the present disclosure provide a sensing resource allocation method, which is performed by a network device. The method can be executed independently or in conjunction with any other embodiment of the present disclosure. FIG. 4 is a flowchart of a sensing resource allocation method according to an embodiment. As shown in FIG. 4, the method includes steps 401-405.

In step 401, a sensing resource request is received from a user equipment, where the sensing resource request includes a characteristic of a sensing service of the user equipment.

In step 402, according to the characteristic of the sensing service, a sensing resource for the sensing service is allocated to the user equipment.

In step 403, the information of the sensing resource for sensing service is transmitted to the user equipment.

In step 404, a message from the user equipment indicating an end of the sensing service is received.

In step 405, the sensing resource is reclaimed.

In an embodiment, a network device receives a sensing resource request from a user equipment, where the sensing resource request includes the characteristic of the sensing service of the user equipment; and according to the characteristic of the sensing service, the network device allocates the sensing resource for the sensing service to the user equipment that transmits the sensing resource request, and then transmits the information of the allocated sensing resource to the user equipment. When the network device receives a message indicating the end of sensing service from the user equipment, the network device reclaims the sensing resource for the sensing service allocated to the user equipment, that is, the sensing resource previously allocated to the user equipment can be allocated to another user equipment for use.

In the above embodiments, the network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency. In addition, when the network device receives a message indicating the end of sensing service from the user equipment, the network device reclaims the sensing resource allocated to the user equipment, which can achieve more efficient utilization of the sensing resource.

Figure 5:
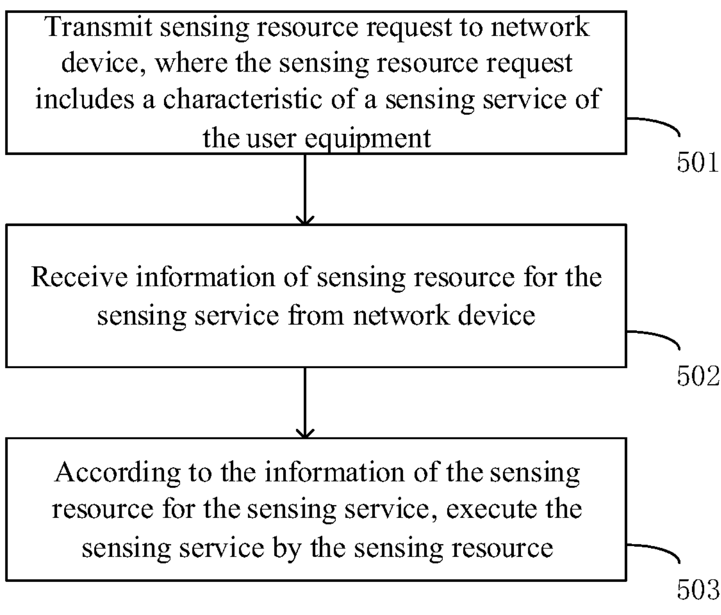
FIG. 5 is a flowchart of a sensing resource usage method according to an embodiment.

The embodiments of the present disclosure provide a sensing resource usage method, which is performed by a user equipment. The method can be executed independently or in conjunction with any other embodiment of the present disclosure. FIG. 5 is a flowchart of a sensing resource usage method according to an embodiment. As shown in FIG. 5, the method includes steps 501-503.

In step 501, a sensing resource request is transmitted to a network device, where the sensing resource request includes a characteristic of a sensing service of the user equipment.

In step 502, information of a sensing resource for the sensing service is received from a network device.

In step 503, according to the information of the sensing resource for the sensing service, the sensing service is executed by the sensing resource.

In an embodiment, the user equipment transmits a sensing resource request to the network device, where the sensing resource request includes the characteristic of the sensing service of the user equipment. Then, the user equipment receives information from the network device about the sensing resource used for sensing service, and based on the information of the sensing resource, utilizes the sensing resource to perform sensing service.

In an embodiment, the characteristic of the sensing service reported by the user equipment to the network device includes at least one of: a sensing distance, a sensing range, a size of a sensed object, a shape of a sensed object, or a motion state of a sensed object.

In the above embodiments, the sensing resource allocated by the network device and received by the user equipment are a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

The embodiments of the present disclosure provide a sensing resource usage method, which is performed by a user equipment. The method can be executed independently or in conjunction with any other embodiment of the present disclosure. The method includes: transmitting a sensing resource request to a network device, where the sensing resource request includes a characteristic of a sensing service of the user equipment; receiving information of a sensing resource for the sensing service from the network device; and according to the information of the sensing resource for the sensing service, executing the sensing service by the sensing resource.

The sensing resource includes:

one or more time ranges for transmitting sensing signals; and one or more time ranges for receiving reflected signals;

where to-be-allocated sensing resources include time periods in a time domain, where each of the time periods includes time ranges.

In an embodiment, the user equipment transmits a sensing resource request to the network device, where the sensing resource request includes the characteristic of the sensing service of the user equipment. Then, the user equipment receives information from the network device about the sensing resource used for sensing service, and based on the information of the sensing resource, uses the sensing resource to perform sensing service. The sensing resource received by the user equipment includes one or more time ranges for transmitting sensing signals and one or more time ranges for receiving reflected signals.

The to-be-allocated sensing resources include time periods in a time domain, where each of the time periods includes time ranges. The duration of each of the time ranges of the same time period can be the same or different.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

The embodiments of the present disclosure provide a sensing resource usage method, which is performed by a user equipment. The method can be executed independently or in conjunction with any other embodiment of the present disclosure. The method includes: transmitting a sensing resource request to a network device, where the sensing resource request includes a characteristic of a sensing service of the user equipment; receiving information of a sensing resource for the sensing service from the network device; and according to the information of the sensing resource for the sensing service, executing the sensing service by the sensing resource.

The sensing resource includes:

- a first time range for transmitting sensing signals and a second time range, where the first time range for transmitting sensing signals and the second time range for receiving reflected signals belong to the same time period;
- where to-be-allocated sensing resources include time periods in a time domain, where each of the time periods includes time ranges.

In an embodiment, the user equipment transmits a sensing resource request to the network device, where the sensing resource request includes the characteristic of the sensing service of the user equipment. Then, the user equipment receives information from the network device about the sensing resource used for sensing service, and based on the information of the sensing resource, uses the sensing resource to perform sensing service. The sensing resource received by the user equipment includes a first time range for transmitting sensing signals and a second time range for receiving reflected signals, where the first time range and the second time range belong to the same time period.

In an embodiment, the to-be-allocated sensing resources are divided into the following time ranges in the time domain: $T_0, T_1, T_2, \ldots, T_{N-1}, T_0, T_1, T_2, \ldots, T_{N-1}, T_0, T_1, T_2, \ldots, T_{N-1}, \ldots$. The user equipment transmits a sensing resource request to the network device, where the sensing resource request includes the characteristic of the sensing service of the user equipment, and the characteristic is: sensing the motion speed of an object approximately 1 square meter within a range of 3 to 5 meters; then, the user equipment receives information of the sensing resource for the sensing service from the network device, where the information of the sensing resource includes the first time range $T_3$ for transmitting sensing signals and the second time range $T_8$ for receiving reflected signals; according to the information of the sensing resource, the user equipment uses the corresponding sensing resource to perform the sensing service. Since the sensing distance is short, the first time range $T_3$ and the second time range $T_8$ belong to the same time period.

In an embodiment, the to-be-allocated sensing resources are divided into the following time ranges in the time domain: $T_0, T_1, T_2, \ldots, T_{N-1}, T_0, T_1, T_2, \ldots, T_{N-1}, T_0, T_1, T_2, \ldots, T_{N-1}, \ldots$. The user equipment transmits a sensing resource request to the network device, where the sensing resource request includes the characteristic of the sensing service of the user equipment, and the characteristic is: sensing the motion speed of an object approximately 1 square meter within a range of 30 to 50 meters; then, the user equipment receives information of the sensing resource for the sensing service from the network device, where the sensing resource includes the first time range $T_3$ for transmitting sensing signals and the second time range $T_8$ for receiving reflected signals; according to the information of the sensing resource, the user equipment uses the corresponding sensing resource to perform the sensing service. Since the sensing distance is long, the first time range $T_3$ and the second time range $T_8$ respectively belong to different time periods, for example, two adjacent time periods.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

The embodiments of the present disclosure provide a sensing resource usage method, which is performed by a user equipment. The method can be executed independently or in conjunction with any other embodiment of the present disclosure. The method includes: transmitting a sensing resource request to a network device, where the sensing resource request includes a characteristic of a sensing service of the user equipment; receiving information of a sensing resource for the sensing service from the network device; and according to the information of the sensing resource for the sensing service, executing the sensing service by the sensing resource.

The sensing resource includes:

- a first time range set for transmitting sensing signals and a second time range set for receiving reflected signals, where the first time range set and the second time range set both include time ranges, and the first time range set and the second time range set belong to the same time period.

To-be-allocated sensing resources include time periods in a time domain, where each of the time periods includes time ranges.

In an embodiment, the user equipment transmits a sensing resource request to the network device, where the sensing resource request includes the characteristic of the sensing service of the user equipment. Then, the user equipment receives information from the network device about the sensing resource used for sensing service, and based on the information of the sensing resource, uses the sensing resource to perform sensing service. The sensing resource received by the user equipment includes a first time range set for transmitting sensing signals and a second time range set for receiving reflected signals, where the first time range set and the second time range set belong to the same time period.

In an embodiment, the to-be-allocated sensing resources are divided into the following time ranges in the time domain: $T_0, T_1, T_2, \ldots, T_{N-1}, T_0, T_1, T_2, \ldots, T_{N-1}, T_0, T_1, T_2, \ldots, T_{N-1}, \ldots$. The user equipment transmits a sensing resource request to the network device, where the sensing resource request includes the characteristic of the sensing service of the user equipment, and the characteristic is: sensing the shape of an object approximately 5 square meters within a range of 10 to 20 meters; then, the user equipment receives information of the sensing resource for the sensing service from the network device, where the sensing resource includes the first time range set $T_2$-$T_4$ for transmitting sensing signals and the second time range set $T_8$-$T_{12}$ for receiving reflected signals; according to the information of the sensing resource, the user equipment uses the corresponding sensing resource to perform the sensing service. Since the sensing distance is short, the first time range set $T_2$-$T_4$ and the second time range set $T_8$-$T_{12}$ belong to the same time period.

In an embodiment, the to-be-allocated sensing resources are divided into the following time ranges in the time domain: $T_0, T_1, T_2, \ldots, T_{N-1}, T_0, T_1, T_2, \ldots, T_{N-1}, T_0, T_1, T_2, \ldots, T_{N-1}, \ldots$. The user equipment transmits a sensing resource request to the network device, where the sensing resource request includes the characteristic of the sensing service of the user equipment, and the characteristic is: sensing the shape of an object approximately 5 square meters within a range of 70 to 80 meters; then, the user equipment receives information of the sensing resource for the sensing service from the network device, where the sensing resource includes the first time range set $T_2$-$T_4$ for transmitting sensing signals and the second time range set $T_8$-$T_{12}$ for receiving reflected signals; according to the information of the sensing resource, the user equipment uses the corresponding sensing resource to perform the sensing service. Since the sensing distance is long, the first time range set $T_2$-$T_4$ and the second time range set $T_8$-$T_{12}$ respectively belong to different time periods, for example, two adjacent time periods.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

The embodiments of the present disclosure provide a sensing resource usage method, which is performed by a user equipment. The method can be executed independently or in conjunction with any other embodiment of the present disclosure. The method includes: transmitting a sensing resource request to a network device, where the sensing resource request includes a characteristic of a sensing service of the user equipment; receiving information of a sensing resource for the sensing service from the network device; and according to the information of the sensing resource for the sensing service, executing the sensing service by the sensing resource.

The sensing resource includes:

- one or more time ranges for transmitting sensing signals;
- one or more time ranges for receiving reflected signals; and
- the maximum number of time periods occupied by the one or more time ranges for transmitting sensing signals and the one or more time ranges for receiving reflected signals.

To-be-allocated sensing resources include time periods in a time domain, where each of the time periods includes time ranges.

In an embodiment, the user equipment transmits a sensing resource request to the network device, where the sensing resource request includes the characteristic of the sensing service of the user equipment. Then, the user equipment receives information from the network device about the sensing resource used for sensing service, where the information of the sensing resource includes one or more time ranges for transmitting sensing signals, one or more time ranges for receiving reflected signals, and the maximum number of time periods occupied by the one or more time ranges for transmitting sensing signals and the one or more time ranges for receiving reflected signals; and based on the information of the sensing resource, the user equipment uses the sensing resource to perform sensing service.

When the user equipment executes the sensing service, the transmission of sensing signals and the reception of reflected signals appear in pairs. Therefore, the maximum number of time periods occupied by the one or more time ranges for transmitting sensing signals is the same as the maximum number of time periods occupied by the one or more time ranges for receiving reflected signals.

When the first time range/the first time range set for transmitting sensing signals and the second time range/the second time range set for receiving reflected signals belong to the same time period, the maximum number of time periods occupied by the one or more time ranges for transmitting sensing signals and the one or more time ranges for receiving reflected signals mentioned above is the maximum number of time periods occupied by the one or more time ranges for transmitting sensing signals, or the maximum number of time periods occupied by the one or more time ranges for receiving reflected signals.

When the first time range/the first time range set for transmitting sensing signals and the second time range/the second time range set for receiving reflected signals belong to different time periods, the maximum number of time periods occupied by the one or more time ranges for transmitting sensing signals and the one or more time ranges for receiving reflected signals mentioned above is the maximum number of time periods occupied by the one or more time ranges for transmitting sensing signals plus the maximum number of time periods occupied by the one or more time ranges for receiving reflected signals.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

Figure 6:
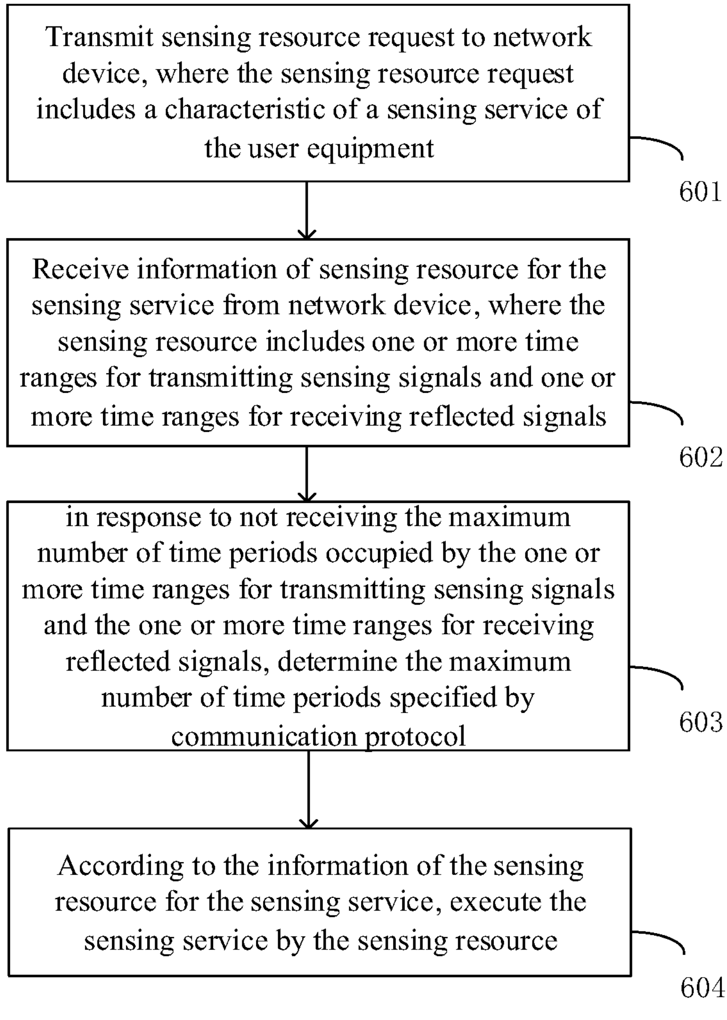
FIG. 6 is a flowchart of a sensing resource usage method according to an embodiment.

The embodiments of the present disclosure provide a sensing resource usage method, which is performed by a user equipment. The method can be performed independently or in conjunction with any other embodiment of the present disclosure. FIG. 6 is a flowchart of a sensing resource usage method according to an embodiment. As shown in FIG. 6, the method includes steps 601-604.

In step 601, a sensing resource request is transmitted to a network device, where the sensing resource request includes a characteristic of a sensing service of the user equipment.

In step 602, information of a sensing resource for the sensing service is received from a network device, where the sensing resource includes one or more time ranges for transmitting sensing signals and one or more time ranges for receiving reflected signals, where the to-be-allocated sensing resources include time periods in the time domain, and each of the time periods includes time ranges.

In step 603, in response to not receiving the maximum number of time periods occupied by the one or more time ranges for transmitting sensing signals and the one or more time ranges for receiving reflected signals, the maximum number of time periods specified by a communication protocol is determined.

In step 604, according to the information of the sensing resource for the sensing service, the sensing service is executed by the sensing resource.

In an embodiment, the user equipment transmits a sensing resource request to the network device, where the sensing resource request includes the characteristic of the sensing service of the user equipment, and then the user equipment receives information of the sensing resource used for the sensing service from the network device, where the sensing resource includes time range(s) for transmitting sensing signal(s) and time range(s) for receiving reflected signal(s). Since the information of the sensing resource does not include the maximum number of time periods occupied by the time range(s) for transmitting sensing signal(s) and the time range(s) for receiving reflected signal(s), i.e. the maximum number of time periods occupied by the time range(s) for transmitting sensing signal(s) and the time range(s) for receiving reflected signal(s) is not received by the user equipment from the network device, the user equipment determines the maximum number of time periods specified in the communication protocol, and according to the time range(s) for transmitting sensing signal(s), the time range(s) for receiving reflected signal(s), and the maximum number of time periods, executes the sensing service by the sensing resource.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals. In addition, the user equipment can also determine the maximum number of time periods based on communication protocols, facilitating the execution of the sensing service.

Figure 7:
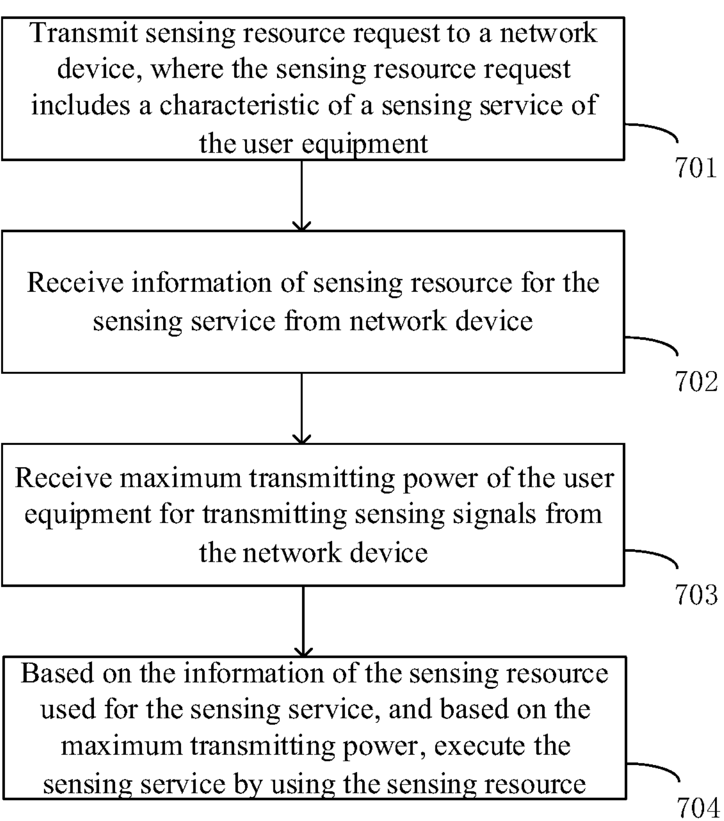
FIG. 7 is a flowchart of a sensing resource usage method according to an embodiment.

The embodiments of the present disclosure provide a sensing resource usage method, which is performed by a user equipment. The method can be executed independently or in conjunction with any other embodiment of the present disclosure. FIG. 7 is a flowchart of a sensing resource usage method according to an embodiment. As shown in FIG. 7, the method includes steps 701-704.

In step 701, a sensing resource request is transmitted to a network device, where the sensing resource request includes a characteristic of a sensing service of the user equipment.

In step 702, information of a sensing resource for the sensing service is received from a network device.

In step 703, a maximum transmitting power of the user equipment for transmitting sensing signals is received from the network device.

In step 704, based on the information of the sensing resource used for the sensing service, and based on the maximum transmitting power, the sensing service is executed by using the sensing resource.

In an embodiment, the user equipment transmits a sensing resource request to the network device, where the sensing resource request includes the characteristic of the sensing service of the user equipment. Then, the user equipment receives information of the sensing resource used for sensing service from the network device and the maximum transmitting power of the user equipment for transmitting sensing signals. Based on the information of the sensing resource, the user equipment uses the sensing resource, and based on the maximum transmitting power, executes the sensing service. The maximum transmitting power here is determined by the network device based on the characteristic of the sensing service, so the maximum transmitting power is suitable for the sensing service. For example, when the sensing distance is short, the maximum transmitting power can be determined as a smaller power; and when the sensing distance is long, the maximum transmitting power can be determined as a larger power.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals. In addition, reasonably setting the transmitting power of the sensing signal for the user equipment can help control the power of the user equipment.

Figure 8:
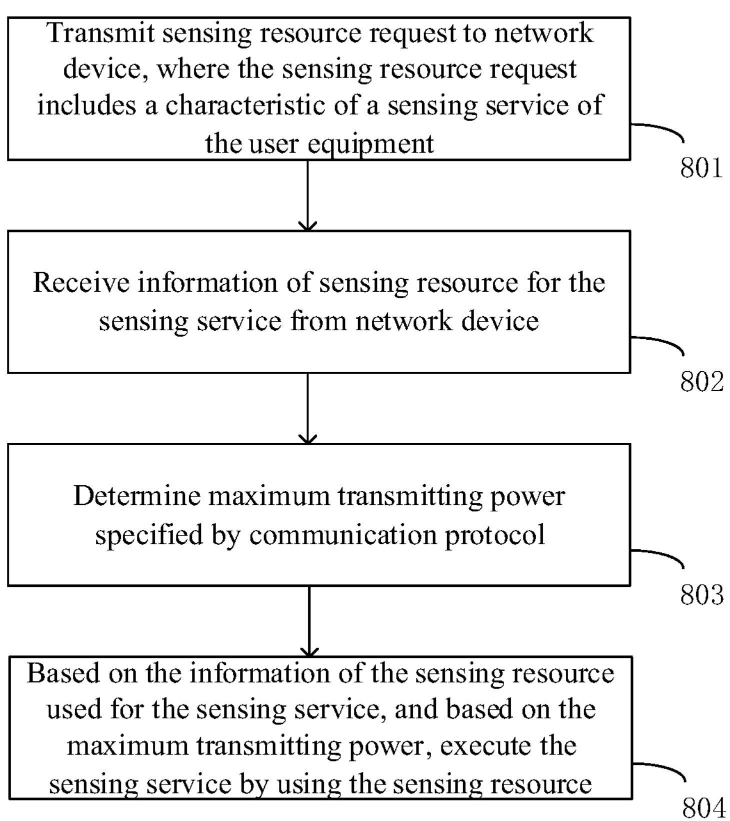
FIG. 8 is a flowchart of a sensing resource usage method according to an embodiment.

The embodiments of the present disclosure provide a sensing resource usage method, which is performed by a user equipment. The method can be performed independently or in conjunction with any other embodiment of the present disclosure. FIG. 8 is a flowchart of a sensing resource usage method according to an embodiment. As shown in FIG. 8, the method includes steps 801-804.

In step 801, a sensing resource request is transmitted to a network device, where the sensing resource request includes a characteristic of a sensing service of the user equipment.

In step 802, information of a sensing resource for the sensing service is received from a network device.

In step 803, a maximum transmitting power specified by a communication protocol is determined.

In step 804, based on the information of the sensing resource used for the sensing service, and based on the maximum transmitting power, the sensing service is executed by using the sensing resource.

In an embodiment, the user equipment transmits a sensing resource request to the network device, where the sensing resource request includes the characteristic of the sensing service of the user equipment. The user equipment receives information of the sensing resource used for the sensing service from the network device and determines the maximum transmitting power specified in the communication protocol. Then, based on the information of the sensing resource, the user equipment uses the sensing resource to execute the sensing service based on the maximum transmitting power.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals. In addition, reasonably setting the transmitting power of the sensing signal for the user equipment can help control the power of the user equipment. The user equipment can also determine the maximum transmitting power based on communication protocols, facilitating the execution of the sensing service.

The embodiments of the present disclosure provide a sensing resource usage method, which is performed by a user equipment. The method can be performed independently or in conjunction with any other embodiment of the present disclosure. The method includes: transmitting a sensing resource request to a network device, where the sensing resource request includes a characteristic of a sensing service of the user equipment; receiving information of a sensing resource for the sensing service from the network device; and according to the information of the sensing resource for the sensing service, executing the sensing service by the sensing resource.

The characteristic of the sensing service includes at least one of:

- a sensing distance, a sensing range, a size of a sensed object, a shape of a sensed object, or a motion state of a sensed object.

In an embodiment, the user equipment transmits a sensing resource request to the network device, where the sensing resource request includes the characteristic of the sensing service of the user equipment. The characteristic of the sensing service includes at least one of: a sensing distance, a sensing range, a size of a sensed object, a shape of a sensed object, or a motion state of a sensed object. The user equipment receives information of the sensing resource used for the sensing service from the network device, and then uses the sensing resource to execute the sensing service based on the information of the sensing resource.

For example, the characteristic of the sensing service reported by the user equipment through a sensing resource request is: sensing a motion speed of an object approximately 1 square meter within a range of 3 to 5 meters. For example, the characteristic of the sensing service reported by the user equipment through a sensing resource request is: sensing a shape of an object approximately 5 square meters within a range of 20 to 30 meters.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals.

Figure 9:
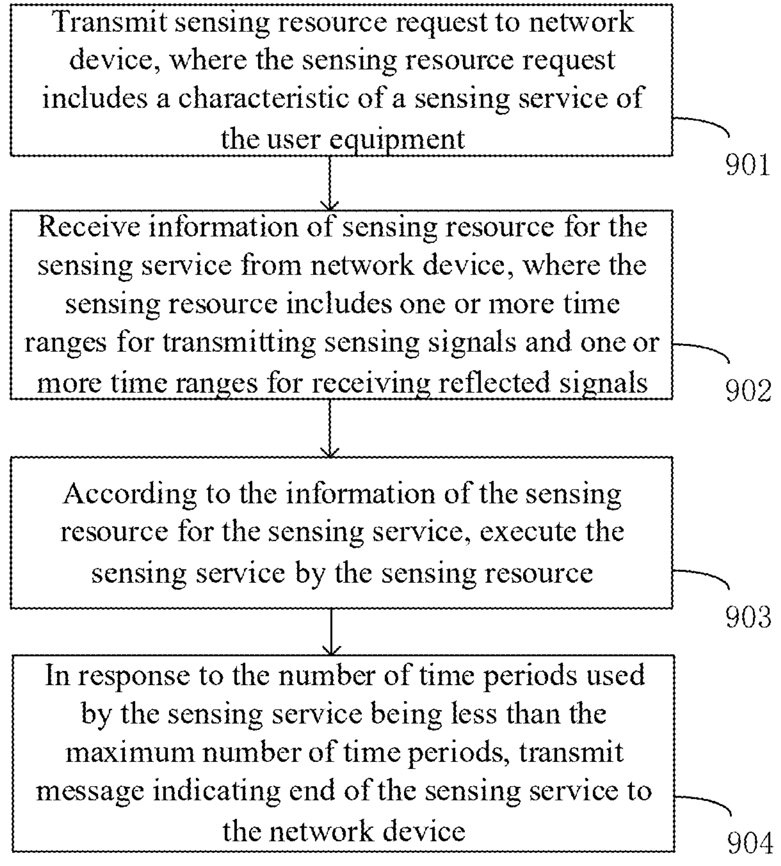
FIG. 9 is a flowchart of a sensing resource usage method according to an embodiment.

The embodiments of the present disclosure provide a sensing resource usage method, which is performed by a user equipment. The method can be performed independently or in conjunction with any other embodiment of the present disclosure. FIG. 9 is a flowchart of a sensing resource usage method according to an embodiment. As shown in FIG. 9, the method includes steps 901-904.

- In step 901, a sensing resource request is transmitted to a network device, where the sensing resource request includes a characteristic of a sensing service of the user equipment.
- In step 902, information of a sensing resource for the sensing service is received from a network device, where the sensing resource includes one or more time ranges for transmitting sensing signals and one or more time ranges for receiving reflected signals, where the to-be-allocated sensing resources include time periods in the time domain, and each of the time periods includes time ranges.
- In step 903, according to the information of the sensing resource for the sensing service, the sensing service is executed by the sensing resource.
- In step 904, in response to the number of time periods used by the sensing service being less than the maximum number of time periods, a message indicating an end of the sensing service is transmitted to the network device. The maximum number of time periods is the maximum number of time periods occupied by the one or more time ranges used for transmitting the sensing signals and the one or more time ranges used for receiving the reflected signals.

In an embodiment, the user equipment transmits a sensing resource request to the network device, where the sensing resource request includes the characteristic of the sensing service of the user equipment, and then the user equipment receives information of the sensing resource used for the sensing service from the network device, where the sensing resource includes one or more time ranges for transmitting sensing signals and one or more time ranges for receiving reflected signals. Then, based on the information of the sensing resource, the user equipment uses the sensing resource to perform the sensing service. When the number of time periods used by the user equipment to complete the sensing service is less than the maximum number of time periods, a message indicating the end of the sensing service is transmitted to the network device.

In an embodiment, the user equipment transmits a sensing resource request to the network device, where the sensing resource request includes the characteristic of the sensing service of the user equipment. Then, the user equipment receives information from the network device about the sensing resource used for sensing service, where the sensing resource includes one or more time ranges for transmitting sensing signals, one or more time ranges for receiving reflected signals, and the maximum number of time periods occupied by the one or more time ranges for transmitting sensing signals and the one or more time ranges for receiving reflected signals; and based on the information of the sensing resource, the user equipment uses the sensing resource to perform sensing service. When the number of time periods used by the user equipment to complete the sensing service is less than the maximum number of time periods, a message indicating the end of the sensing service is transmitted to the network device.

In an embodiment, the user equipment transmits a sensing resource request to the network device, where the sensing resource request includes the characteristic of the sensing service of the user equipment. Then, the user equipment receives information from the network device about the sensing resource used for sensing service, where the sensing resource includes one or more time ranges for transmitting sensing signals and one or more time ranges for receiving reflected signals; and the user equipment determines the maximum number of time periods occupied by the one or more time ranges for transmitting sensing signals and the one or more time ranges for receiving reflected signals, where the maximum number of time periods is specified by the communication protocol; and based on the information of the sensing resource, the user equipment uses the sensing resource to perform sensing service. When the number of time periods used by the user equipment to complete the sensing service is less than the maximum number of time periods, a message indicating the end of the sensing service is transmitted to the network device.

In the above embodiments, the sensing resource allocated by the network device and received by the user equipment is a sensing resource suitable for the sensing service of the user equipment. Therefore, when the user equipment uses the sensing resource to execute the sensing service, the user equipment can effectively utilize the sensing resource, which can improve resource utilization rate, and avoid interference between sensing signals. In addition, when the number of time periods used by the sensing service is less than the maximum number of time periods, the user equipment reports a message indicating the end of the sensing service to the network device, which facilitates the network device to reclaim the sensing resource allocated to the user equipment, thereby achieving more efficient utilization of the sensing resource.

Figure 10:
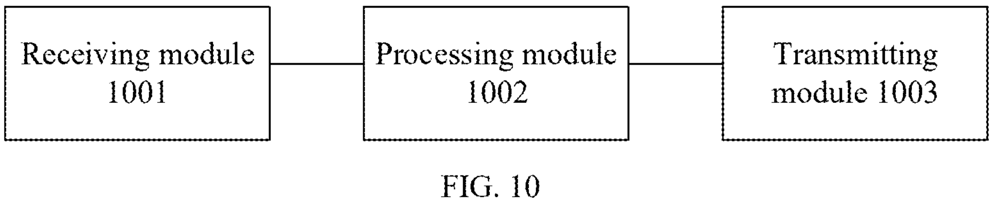
FIG. 10 is a block diagram of a sensing resource allocation apparatus according to an embodiment.

The embodiments of the present disclosure provide a sensing resource allocation apparatus, applied to a network device. As shown in FIG. 10, the apparatus includes:

- a receiving module 1001, configured to receive a sensing resource request from a user equipment, where the sensing resource request includes a characteristic of a sensing service of the user equipment;
- a processing module 1002, configured to, according to the characteristic of the sensing service, allocate a sensing resource for the sensing service to the user equipment; and
- a transmitting module 1003, configured to transmit information of the sensing resource for the sensing service to the user equipment.

Figure 11:
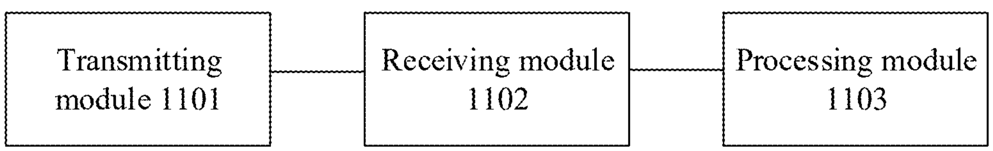
FIG. 11 is a block diagram of a sensing resource usage apparatus according to an embodiment.

The embodiments of the present disclosure provide a sensing resource usage apparatus, applied to a user equipment. As shown in FIG. 11, the apparatus includes:

- a transmitting module 1101, configured to transmit a sensing resource request to a network device, where the sensing resource request includes a characteristic of a sensing service of the user equipment;
- a receiving module 1102, configured to receive information of a sensing resource for the sensing service from the network device; and
- a processing module, configured to, according to the information of the sensing resource for the sensing service, execute the sensing service by the sensing resource.

The embodiments of the present disclosure provide a network-side device, including: one or more processors; and

- a memory storing instructions executable by the processor;
- where the one or more processors are configured to execute the instructions in the one or more memories to implement the sensing resource allocation method mentioned above.

The embodiments of the present disclosure provide a mobile terminal including:

- one or more processors; and
- a memory storing instructions executable by the processor;
- where the one or more processors are configured to execute the instructions in the one or more memories to implement the sensing resource usage method mentioned above.

In the embodiments of the present disclosure, a non-temporary computer-readable storage medium is provided, on which executable instructions are stored. When the executable instructions are executed by one or more processor, the sensing resource allocation method or the sensing resource usage method is implemented.

Figure 12:
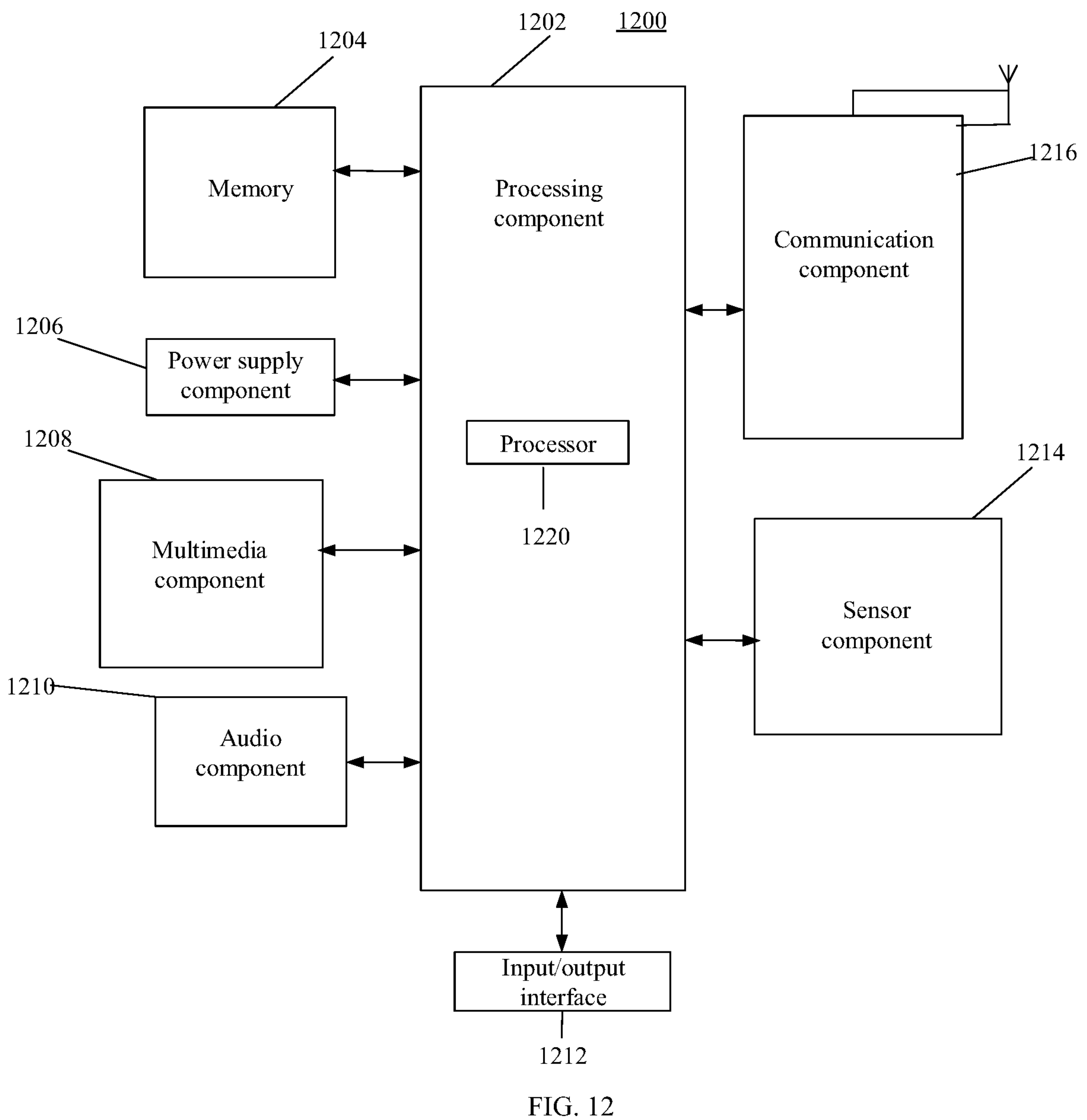
FIG. 12 is a structural diagram of a sensing resource usage apparatus according to an embodiment.

FIG. 12 is a block diagram of an apparatus 1200 for sensing resource using according to an embodiment. For example, device 1200 can be a mobile phone, a computer, a digital broadcast terminal, a message transmitting and receiving device, a gaming console, a tablet device, a medical device, a fitness device, a personal digital assistant, and the like.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the overall operations of the electronic device 1200, such as operations associated with display, calling, data communication, camera operation and recording operation. The processing assembly 1202 may include one or more processors 1220 to execute instructions to complete all or a part of the blocks of the above methods. Further, the processing component 1202 may include one or more modules to facilitate interaction between the processing component 1202 and another component. For example, the processing component 1202 may include a multimedia module to facilitate the interaction between the multimedia component 1208 and the processing component 1202.

The memory 1204 is configured to store different types of data to support operations at the apparatus 1200. Examples of such data include instructions of any application program or method operable on the electronic device 1200, contact data, telephone directory data, messages, pictures, videos, and the like. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1206 provides power for different components of the electronic device 1200. The power supply component 1206 may include a power management system, one or more power sources, and other components associated with generating, managing and distributing power for the electronic device 1200.

The multimedia component 1208 may include a screen for providing an output interface between the electronic device 1200 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding movement, but also detect duration and pressure related to the touching or sliding operation. In some examples, the multimedia component 1208 may include a front camera and/or a rear camera. When the apparatus 1200 is in an operation mode, such as a shooting mode or a video mode, the front camera and/or the rear camera may receive external multimedia data. Each of the front camera and the rear camera may be a fixed optical lens system or be of a focal length and a capability of an optical zoom.

The audio component 1210 is configured to output and/or input an audio signal. For example, the audio component 1210 may include a microphone (MIC). When the electronic device 1200 is in an operating mode, such as a call mode, a recording mode and a speech recognition mode, the microphone is configured to receive an external audio signal. The received audio signal may be further stored in the memory 1204 or transmitted via the communication component 1216. In some examples, the audio component 1210 also includes a loudspeaker for outputting an audio signal.

The I/O interface 1212 provides an interface between the processing component 1202 and a peripheral interface module which may be a keyboard, a click wheel, a button, or the like. These buttons may include but not limited to, a home button, a volume button, a start button and a lock button.

The sensor component 1214 may include one or more sensors for providing state assessments in different aspects for the electronic device 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor for detecting the existence of a nearby object without any physical touch. The sensor component 1214 may also include an optical sensor, such as a CMOS or CCD image sensor used in an imaging application. In some examples, the sensor component 1214 may also include an acceleration sensor, a gyro sensor, a magnetic sensor, a pressure sensor, or a temperature sensor.

The communication component 1216 is configured to facilitate wired or wireless communication between the electronic device 1200 and other devices. The electronic device 1200 may access a wireless network based on a communication standard, such as WIFI, 2G or 3G, or a combination thereof. In some embodiments, the communication component 1216 may receive a broadcast signal or broadcast-related information from an external broadcast management system via a broadcast channel. In an example, the communication component 1216 may also include a Near Field Communication (NFC) module to facilitate short-range communications. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method described above.

In an example, a non-transitory computer readable storage medium including instructions, such as the memory 1204 including instructions, is also provided. The above instructions may be executed by the processor 1220 of the apparatus 1200 to complete the above method. For example, the non-transitory computer readable storage medium may be a Read-Only Memory (ROM), a Random Access Memory (RAM), a CD-ROM, a magnetic tape, a floppy disk and an optical data storage device, etc.

Figure 13:
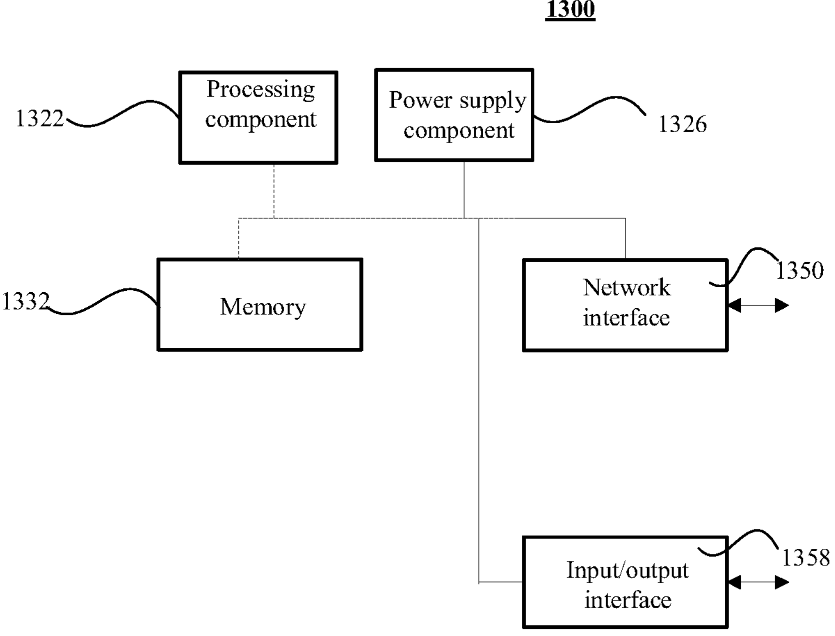
FIG. 13 is a structural diagram of a sensing resource allocation apparatus according to an embodiment.

FIG. 13 is a block diagram of an apparatus 1300 for sensing resource allocating according to an embodiment. For example, the apparatus 1300 may be provided as a base station. Referring to FIG. 13, the apparatus 1300 includes a processing component 1322, which further includes one or more processors, and a memory resource represented by a memory 1332 for storing instructions, such as applications, that can be executed by the processing component 1322. The application stored in the memory 1332 may include one or more modules and each module corresponds to a set of instructions. In addition, the processing component 1322 is configured to execute instructions to execute the access method of the unauthorized channel mentioned above.

The apparatus 1300 may further include: a power component 1326, configured to perform power management of the device 1300; a wired or wireless network interface 1350, configured to connect the apparatus 1300 to the network; and an input/output (I/O) interface 1359. The apparatus 1300 may operate based on an operating system, such as Windows Server™, Mac OS X™, Unix™, Linux™, FreeBSD™ or the like, stored in the memory 1332.

Other implementations of the present disclosure will be apparent to those skilled in the art from consideration of the specification and practice of the present disclosure herein. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and embodiments herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

INDUSTRIAL APPLICABILITY

The network device allocates the sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

In some embodiments, a sensing resource allocation method is provided, where the method is performed by a network device, and includes:

receiving a sensing resource request from a user equipment, where the sensing resource request includes a characteristic of a sensing service of the user equipment;

according to the characteristic of the sensing service, allocating a sensing resource for the sensing service to the user equipment; and transmitting information of the sensing resource for the sensing service to the user equipment.

In some embodiments, the method further includes:

determining that to-be-allocated sensing resources includes time periods in a time domain, where each of the time periods includes time ranges.

In some embodiments, the sensing resource for the sensing service includes:

one or more time ranges for transmitting sensing signals; and one or more time ranges for receiving reflected signals.

In some embodiments, the sensing resource for the sensing service includes:

a first time range for transmitting sensing signals and a second time range for receiving reflected signals;

where the first time range and the second time range belong to a same time period.

In some embodiments, the sensing resource for the sensing service includes:

a first time range set for transmitting sensing signals and a second time range set for receiving reflected signals, where the first time range set includes time ranges, and the second time range set includes time ranges;

where the first time range set and the second time range set belong to a same time period.

In some embodiments, the sensing resource for the sensing service further includes:

the maximum number of time periods occupied by the one or more time ranges for transmitting sensing signals and the one or more time ranges for receiving reflected signals.

In some embodiments, the method further includes:

according to the characteristic of the sensing service, determining a maximum transmitting power of the user equipment for transmitting sensing signals; and transmitting information of the maximum transmitting power to the user equipment.

In some embodiments, the characteristic of the sensing service includes at least one of:

a sensing distance, a sensing range, a size of a sensed object, a shape of a sensed object, or a motion state of a sensed object.

In some embodiments, the method further includes:

receiving a message from the user equipment indicating an end of the sensing service; and reclaiming the sensing resource.

In some embodiments, a sensing resource usage method is provided, where the method is performed by a user equipment and includes:

transmitting a sensing resource request to a network device, where the sensing resource request includes a characteristic of a sensing service of the user equipment;

receiving information of a sensing resource for the sensing service from the network device; and according to the information of the sensing resource for the sensing service, executing the sensing service by the sensing resource.

In some embodiments, the sensing resource includes:

one or more time ranges for transmitting sensing signals; and one or more time ranges for receiving reflected signals;

where to-be-allocated sensing resources include time periods in a time domain, where each of the time periods includes time ranges.

In some embodiments, the sensing resource includes:

a first time range for transmitting sensing signals and a second time range for receiving reflected signals;

where the first time range and the second time range belong to a same time period.

In some embodiments, the sensing resource includes:

a first time range set for transmitting sensing signals and a second time range set for receiving reflected signals, where the first time range set includes time ranges, and the second time range set includes time ranges;

where the first time range set and the second time range set belong to a same time period.

In some embodiments, the sensing resource further includes:

the maximum number of time periods occupied by the one or more time ranges for transmitting sensing signals and the one or more time ranges for receiving reflected signals.

In some embodiments, the method further includes:

in response to not receiving the maximum number of time periods occupied by the one or more time ranges for transmitting sensing signals and the one or more time ranges for receiving reflected signals, determining the maximum number of time periods specified by a communication protocol.

In some embodiments, the method further includes:

receiving a maximum transmitting power of the user equipment for transmitting sensing signals from the network device; or determining a maximum transmitting power specified by a communication protocol.

In some embodiments, executing the sensing service includes:

based on the maximum transmitting power, executing the sensing service.

In some embodiments, the characteristic of the sensing service includes at least one of:

a sensing distance, a sensing range, a size of a sensed object, a shape of a sensed object, or a motion state of a sensed object.

In some embodiments, the method further includes:

in response to the number of time periods used by the sensing service being less than the maximum number of time periods, transmitting a message indicating an end of the sensing service to the network device;

where the maximum number of time periods is the maximum number of time periods occupied by the one or more time ranges for transmitting sensing signals and the one or more time ranges for receiving reflected signals.

The technical solution provided by the embodiments of the present disclosure may include following beneficial effects: the network device allocates a sensing resource suitable for the sensing service to the user equipment based on the characteristic of the sensing service. On the one hand, sensing resources are reasonably allocated to avoid interference between sensing signals; and on the other hand, sensing resources can be effectively utilized, which improves resource utilization efficiency.

The invention claimed is:

1. A method for sensing resource allocation, the method comprising:

receiving a sensing resource request from a user equipment, wherein the sensing resource request comprises a characteristic of a sensing service of the user equipment, wherein the characteristic of the sensing service comprises at least one of: a size of a sensed object, a shape of a sensed object, or a motion state of a sensed object;

according to the characteristic of the sensing service, allocating a sensing resource for the sensing service to the user equipment, wherein the sensing resource comprises a plurality of time periods in a time domain, and each of the time periods comprises a plurality of time ranges; wherein the sensing resource further comprises:

a first time range for transmitting sensing signals, and a second time range for receiving reflected sensing signals corresponding to the transmitted sensing signals; wherein the first time range and the second time range belong to a same time period or to different time periods based on the characteristic of the sensing service included in the sensing resource request, wherein the sensing resource for the sensing service further comprises a maximum number of time periods occupied by the time ranges for transmitting sensing signals and the time ranges for receiving reflected signals;

transmitting information of the sensing resource for the sensing service to the user equipment; and receiving a message from the user equipment indicating an end of the sensing service, wherein the user equipment transmits the message indicating an end of the sensing service in response to a number of time periods used by the sensing service being less than the maximum number of time periods.

2. The method according to claim 1, wherein the sensing resource for the sensing service comprises:

a first time range set for transmitting sensing signals and a second time range set for receiving reflected signals, wherein the first time range set comprises time ranges, and the second time range set comprises time ranges;

wherein the first time range set and the second time range set belong to a same time period.

3. The method according to claim 1, further comprising:

according to the characteristic of the sensing service, determining a maximum transmitting power of the user equipment for transmitting sensing signals; and transmitting information of the maximum transmitting power to the user equipment.

4. The method according to claim 1, further comprising: reclaiming the sensing resource.

5. A method for sensing resource usage, the method comprising:

transmitting a sensing resource request to a network device, wherein the sensing resource request comprises a characteristic of a sensing service of a user equipment, wherein the characteristic of the sensing service comprises at least one of: a size of a sensed object, a shape of a sensed object, or a motion state of a sensed object;

receiving information of a sensing resource for the sensing service from the network device;

according to the information of the sensing resource for the sensing service, executing the sensing service by the sensing resource, wherein the sensing resource comprises a plurality of time periods in a time domain, and each of the time periods comprises a plurality of time ranges; wherein the sensing resource further comprises: a first time range for transmitting sensing signals, and a second time range for receiving reflected sensing signals corresponding to the transmitted sensing signals; wherein the first time range and the second time range belong to a same time period or to different time periods based on the characteristic of the sensing service included in the sensing resource request, wherein the sensing resource for the sensing service further comprises a maximum number of time periods occupied by the time ranges for transmitting sensing signals and the time ranges for receiving reflected signals; and in response to a number of time periods used by the sensing service being less than the maximum number of time periods, transmitting the message indicating an end of the sensing service.

6. The method according to claim 5, wherein the sensing resource comprises:

a first time range set for transmitting sensing signals and a second time range set for receiving reflected signals, wherein the first time range set comprises time ranges, and the second time range set comprises time ranges;

wherein the first time range set and the second time range set belong to a same time period.

7. The method according to claim 5, further comprising:

in response to not receiving the maximum number of time periods occupied by the one or more time ranges for transmitting sensing signals and the one or more time ranges for receiving reflected signals, determining the maximum number of time periods specified by a communication protocol.

8. The method according to claim 5, further comprising:

receiving a maximum transmitting power of the user equipment for transmitting sensing signals from the network device; or determining a maximum transmitting power specified by a communication protocol.

9. A network-side device, comprising:

one or more processors; and one or more memories storing instructions executable by the one or more processors;

wherein the instructions when collectively executed by the one or more processors cause the network-side device to collectively perform the method according to claim 1.

10. A mobile terminal, comprising:

one or more processors; and one or more memories storing instructions executable by the one or processors;

wherein the instructions when collectively executed by the one or more processors cause the mobile terminal to perform the method according to claim 5.

11. A non-transitory computer-readable storage medium, on which executable instructions are stored, wherein the executable instructions when executed by one or more processors, cause the one or more processors to collectively perform the method according to claim 1.

12. A non-transitory computer-readable storage medium, on which executable instructions are stored, wherein the executable instructions when executed by one or more processors, cause the one or more processors to collectively perform the method according to claim 5.

* * * * *